United States Patent
Guerret et al.

(10) Patent No.: US 6,646,079 B2
(45) Date of Patent: Nov. 11, 2003

(54) MULTIMODAL POLYMERS BY CONTROLLED RADICAL POLYMERIZATION IN THE PRESENCE OF ALKOXYAMINES

(75) Inventors: Olivier Guerret, Marcy l'Etoile (FR); Sophie Robin, Talence (FR); Yves Gnanou, Talence (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/828,476

(22) Filed: Apr. 9, 2001

(65) Prior Publication Data

US 2002/0040117 A1 Apr. 4, 2002

(30) Foreign Application Priority Data

Apr. 7, 2000 (FR) .............................. 0004557

(51) Int. Cl.[7] .......................... C08F 4/00; C07C 217/02
(52) U.S. Cl. ................... 526/220; 526/193; 526/217; 526/328; 526/346; 525/255; 525/259; 525/299; 564/15; 564/300; 564/301; 252/182.12; 252/182.14; 252/182.23
(58) Field of Search ................ 252/182.12, 182.23, 252/182.14; 526/193, 220, 217, 346, 328; 564/15, 300, 301; 525/255, 259, 299

(56) References Cited

U.S. PATENT DOCUMENTS

| | | | | |
|---|---|---|---|---|
| 3,207,787 A | * | 9/1965 | Levy ..................... | 564/301 X |
| 4,581,429 A | | 4/1986 | Solomon et al. | |
| 5,051,511 A | | 9/1991 | Seltzer et al. | |
| 5,498,679 A | | 3/1996 | Moffat et al. | |
| 5,627,248 A | | 5/1997 | Koster et al. | |
| 5,723,554 A | | 3/1998 | Fujita et al. | |
| 5,877,344 A | | 3/1999 | Gande et al. | |
| 5,910,549 A | * | 6/1999 | Matyjaszewski et al. ... | 526/217 |
| 6,255,448 B1 | * | 7/2001 | Grimaldi et al. ............ | 528/398 |
| 6,262,206 B1 | * | 7/2001 | Nesvadba et al. .......... | 526/220 |

FOREIGN PATENT DOCUMENTS

| | | |
|---|---|---|
| EP | 0 135 280 | 3/1985 |
| EP | 0 881 237 | 2/1998 |
| EP | 0 905 151 | 3/1999 |
| EP | 0 905 153 | 3/1999 |
| EP | 0 992 514 | 4/2000 |
| WO | WO 96/24620 | 8/1996 |
| WO | WO 00/20469 | 4/2000 |
| WO | WO 00/40526 | 7/2000 |
| WO | WO 00/49027 | 8/2000 |
| WO | WO 00/61544 | 10/2000 |
| WO | WO 00/71501 | 11/2000 |

OTHER PUBLICATIONS

Hackh's Chem. Dictionary, 4th ed., J. Grant (ed.), McGraw–Hill, N.Y., p. 27 (1969).*
Philippe Chaumont et al., "Synthesis and Properties of Polymeric Networks Prepared by "Living" Free Radical Polimerization and End–Linking Processes", Aug. 1999, pp 366–367, vol. 40, No. 2, France.
Takeshi Fukuda et al., "Mechanisms and Kinetics of Nitroxide–Controlled Free Radical Polymerization", Macromolecules, 1996, pp 6393–6398, 29, Japan.
Derwent English Abstract of WO 0020469.
Derwent English Abstract of EP992514.
Derwent English Abstract of WO0049027.
Derwent English Abstract of WO0061544.
Derwent English Abstract of WO0071501.
Derwent English Abstract of WO0040526.

* cited by examiner

*Primary Examiner*—Fred Teskin
(74) *Attorney, Agent, or Firm*—Millen, White, Zelano & Branigan, P.C.

(57) ABSTRACT

For the preparation of a multimodal polymer at least one monomer is subjected to free radical polymerization in the presence of several alkoxyamines comprising the sequence of formula:

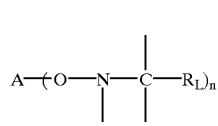

(1)

in which $R_L$ is a monovalent radical exhibiting a molar mass of greater than 15, A represents the core of the alkoxyamine and n is a non-zero integer, the alkoxyamines exhibiting different values of n.

24 Claims, No Drawings

MULTIMODAL POLYMERS BY CONTROLLED RADICAL POLYMERIZATION IN THE PRESENCE OF ALKOXYAMINES

The invention relates to a process for the preparation of polymers with the distribution of multimodal molecular masses ("multimodal polymer") by controlled radical polymerization.

A distribution of molecular masses is said to be multimodal when it comprises several groups of molecules with different average molecular masses. This may be reflected by the existence of a simple shoulder on the flank of the main peak or by the existence of several maxima in the curve obtained by gel permeation chromatography (GPC).

A polymer comprising two groups of molecules with different average molecular masses is said to be bimodal (bimodal polymer). A polymer comprising three groups of molecules with different average molecular masses is said to be trimodal (trimodal polymer).

The manufacture of multimodal polymers is a basic challenge in the field of materials as polymers of this type make it possible to combine, in the same material, the properties of each group of molecules from which it is composed. For example, polymers of high mass introduce good mechanical strength, whereas low masses make it possible to retain, in the material, good fluidity at high temperature, which facilitates its processing.

A particular goal is techniques for the preparation of bimodal polymers. This is because the preparation of such polymers is of use as these polymers generally exhibit both, first, good mechanical properties, in particular impact strength (measured by the Izod and/or Charpy test, ISO Standard 180 and ISO Standard 179 respectively), and better behaviour at high temperatures, which is reflected by a high Vicat point and a higher heat deflection temperature or HDT (Vicat: ISO Standard 306, HDT: ISO Standard 75), the said good mechanical properties deriving in particular from the population with high molecular masses, and, secondly, are easy to process, in particular by conversion technologies known to a person skilled in the art (extrusion, injection moulding, transfer compression moulding, thermoforming), due in this instance to the presence of the population with low molecular masses, the latter in fact acting as plasticizer.

In the field of radical polymerization, a known technique for manufacturing such polymers consists in carrying out two successive polymerizations: the first polymerization produces the polymers of low mass, which act as reaction medium for the manufacture of the second family of polymers of high mass (see EP 905153, EP 905151, EP 881237). The disadvantage of such a technique is that it is necessary to have two reactors "in cascade", which involves a large capital cost. Another technique consists in melt blending two resins but the choice of the blends is restricted by the miscibility of the resins. Finally, a third technique consists in partially grafting, to a polymer, another type of polymer, which here again requires a multistage process.

EP 905 151 discloses a technique for producing bimodal polyethylene. U.S. Pat. No. 5,723,554 (from the same family as GB 2 304 721) discloses the preparation of polystyrene with a narrow polydispersity by polymerization of styrene in the presence of stable radicals of nitroxyl type and in the presence of divinylbenzene.

The crosslinking of polymers by a coupling agent in order to obtain networks and gels is described in Polymer Preprints, vol. 40, No. 2, page 366, August 1999 (Chaumont et al).

U.S. Pat. Nos. 5,627,248, 5,498,679 and 4,581,429 disclose the use of a polyalkoxyamine for the synthesis of polymers by polymerization controlled by nitroxides. These three patents describe the use only of one polyalkoxyamine at the same time. In these documents, the base common to the alkoxyamine is the TEMPO radical. These patents relate essentially to the controlled radical polymerization of styrene and its derivatives, since the alkoxyamine used is not suitable for the polymerization of other types of monomer. In U.S. Pat. No. 5,627,248, mixed alkoxyamine-azo compounds are disclosed but the use of a mixture of alkoxyamine and of conventional peroxide or azo initiators is not mentioned in this document.

The following documents may also be mentioned: U.S. Pat. No. 4,581,429, WO 96/24620, French Patent Application No. 99 00127, French Patent Application No. 99 06329, French Patent Application No. 99 04405, French Patent Application No. 99 01998, French Patent Application No. 98 12477 (published under No. FR 2 784 111) and T. Fukuda et al., Macromolecules, 1996, 29, 6393.

The invention makes possible the manufacture of multimodal polymers in a single stage by virtue of the use of specific alkoxyamines. Each group of polymer molecules is obtained in a controlled manner, which means that each peak in the mass distribution can be very fine and that the ratios of the masses of each family to one another are controlled. The technique is particularly suited to the preparation of block copolymers.

The process according to the invention is a controlled radical polymerization process. The control of a radical polymerization improves in proportion as the curve representing the change in the number-average molecular mass (Mn) as a function of the conversion of monomer to polymer approaches linearity. Likewise, the control of a radical polymerization improves in proportion as the curve representing the change in the Napierian logarithm of the M°/M ratio (M° representing the initial concentration of monomer and M representing the concentration of monomer at a given instant during the polymerization) as a function of time approaches linearity.

It is by virtue of the fact that a radical polymerization process is controlled, for example by a stable free radical, that the said process makes possible the preparation of block polymers by successive introduction of different monomers into the polymerization medium. This is because, by virtue of such a process, the polymer in the course of formation is a living polymer.

The process according to the invention makes it possible to prepare multimodal polymers which are well controlled in terms of ratio of the masses of the various populations and in terms of accuracy of the chain lengths, this preparation being carried out by a very simple process involving conventional polymerization techniques used for a monomodal polymer (a single population of molecules). In addition, the living nature of the polymerization makes it possible to prepare multimodal copolymers. Products which are better defined and more varied than those obtained by the processes of the prior art are thus obtained in a conventional reactor with kinetics which are better defined.

According to the prior art, the stable radicals used are mainly from the family of 2,2,6,6-tetramethyl-1-piperidinyloxy (commonly known as "TEMPO"), which can be represented by:

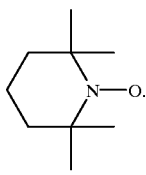

The alkoxyamines derived from TEMPO, and thus of the type:

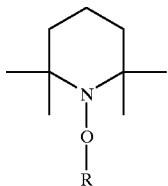

in which R represents, for example, an alkyl radical, are capable of initiating and of controlling polymerizations. However, the kinetics of these polymerizations are not a function of the initial concentration of alkoxyamines. Thus, in such systems, operating with twice as much initiator does not make it possible to multiply by two the conversion as a function of time. In this case, the use of a dialkoxyamine, such as:

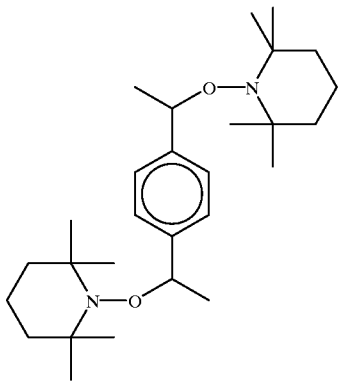

provides the same curve of conversion as a function of time as that obtained with a monoalkoxyamine, such as:

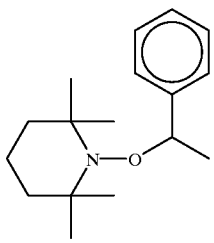

It is probable that the very high importance of thermal initiation in these systems is the cause of this effect.

There is therefore great importance in using alkoxyamines for which the initial concentration is directly related to the kinetics of conversion as it makes it possible to obtain a polymer with a weight-average molecular mass of 100 000 g/mol from a dialkoxyamine in a time equal to that necessary to synthesize a polymer with a weight-average molecular mass of 50 000 g/mol from a monoalkoxyamine. It is by virtue of this discovery that it is possible, in the context of the invention, to prepare controlled (and living) polymers exhibiting a bi- or multimodal distribution of masses by simple polymerization from a mixture of alkoxyamines with different functionalities, without it being necessary to modify the polymerization conditions with respect to the synthesis of a polymer which would be composed only of a group of molecules of low mass.

In comparison with the initiation systems for controlled radical polymerization on the basis of a TEMPO alkoxyamine of the prior art, the specific alkoxyamines used in the context of the present invention provide kinetics which depend on the molar ratio of the monomer to the alkoxyamine functional groups and furthermore make it possible to polymerize, in a controlled manner, monomers other than styrene or its derivatives, such as acrylates, methacrylates, acrylonitrile or acrylics.

The invention relates to a process for the preparation of a multimodal polymer by radical polymerization of at least one monomer in the presence of several alkoxyamines comprising the sequence of formula

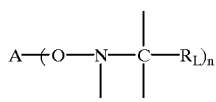

(1)

in which $R_L$ is a monovalent radical exhibiting a molar mass of greater than 15 (which excludes the methyl radical, which has a mass of 15), A is the core of the alkoxyamine and n is a non-zero integer, the said alkoxyamines exhibiting different values of n.

In view of its position, the $R_L$ radical is said to be in the β-position with respect to the nitrogen atom. The value of n in the formula (1) represents the functionality of the alkoxyamine, that is to say the number of nitroxide radicals of formula

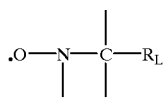

(2)

which it carries and can release during the polymerization. In the context of the present invention, the alkoxyamine of formula (1) is said to carry the nitroxide of formula (2). The nitroxide of formula (2) itself is a stable free radical. Its molecule only exhibits the stable radical state at a single point, that is to say a single unpaired electron characteristic of the radical state which is found on the N—O bond of the formula (2), which is generally represented by N—O. The alkoxyamine, for the case where n is greater than 1, can carry several nitroxides of formula (2) which are different from one another.

It will be remembered that the notion of stable free radical is known to a person skilled in the art to denote a radical which is so persistent and unreactive with respect to the air and to the moisture in the surrounding air that the pure radical can be handled and stored without further precautions at ambient temperature than are the majority of commercial chemicals (see, in this respect, D. Griller and K.

Ingold, Accounts of Chemical Research, 1976, 9, 13–19, or Organic Chemistry of Stable Free Radicals, A. Forrester et al., Academic Press, 1968).

A stable free radical should not be confused with free radicals with a fleeting lifetime (a few milliseconds), such as the free radicals resulting from the usual polymerization initiators, such as peroxides, hydroperoxides and initiators of azo type. The free radicals which initiate polymerization tend to accelerate the polymerization. In contrast, stable free radicals generally tend to slow down the polymerization. It may be generally said that a free radical is stable within the meaning of the present invention if it is not a polymerization initiator and if, under the operating conditions of the present invention, the mean lifetime of the radical is at least one minute. During this mean lifetime, the molecules of the stable free radical continually alternate between the radical state and the state of a group bonded via a covalent bond to a polymer chain. Of course, it is preferable for the stable free radical to exhibit good stability throughout the duration of its use in the context of the present invention. Generally, a stable free radical can be isolated in the radical state at ambient temperature. A stable free radical is sufficiently stable for it to be possible to characterize its free radical state by spectroscopic methods.

During the polymerization, the stable free radical forms a reversible bond with the growing polymer chain. At the end of the polymer chain, the stable free radical continually alternates between the state of a group bonded via a covalent bond to the said chain and the state of a stable free radical detached from the said chain to allow the insertion of a monomer unit, according to the following process,

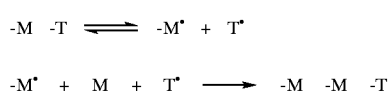

in which –M represents a monomer unit of the growing chain, M represents a monomer unit and T$^\bullet$ represents the monofunctional stable free radical of formula (2) the molecule of which only carries a single site exhibiting the radical state. This process is repeated to bring about the growth of the polymer chain by insertion of monomer between the growing chain and the stable free radical.

Thus, each alkoxyamine can be represented by $A(\text{-}T)_n{}^\bullet$, A and T having the meanings already given and n being an integer at least equal to 1, so that, at the beginning of the polymerization, the bonds between A and the T units are cleaved to form, on the one hand, the $A^{n\bullet}$ radical, which initiates the polymerization, and, on the other hand, the stable radicals T$^\bullet$, which control the polymerization. Thus, the polymer chain grows between A and the ends T. The alkoxyamine of formula $A(\text{-}T)_n$, can comprise T entities which are different in nature.

Thus, in the case of the use of two alkoxyamines A1 and A2, these can be such that their respective functionalities $F_{A1}$ and $F_{A2}$ correspond to one of the combinations listed in the table below:

| COMBINATION | |
|---|---|
| $F_{A1}$ | $F_{A2}$ |
| 1 | 2 |
| 1 | 3 |
| 1 | 4 |
| 1 | 5 |

-continued

| COMBINATION | |
|---|---|
| $F_{A1}$ | $F_{A2}$ |
| 1 | 6 |
| 1 | 7 |
| 1 | 8 |
| 2 | 4 |
| 2 | 5 |
| 2 | 7 |

The remaining valencies of the carbon atom and of the nitrogen atom in the formulae (1) and (2) can be bonded to various radicals, such as a hydrogen atom or a hydrocarbonaceous radical, for example an alkyl, aryl or aralkyl radical, comprising from 1 to 10 carbon atoms. The carbon atom and the nitrogen atom in each of the formulae (1) and (2) can also be connected to one another via bivalent radical, so as to form a ring. Preferably, however, the remaining valencies of the carbon atom and of the nitrogen atom of the formulae (1) and (2) are bonded to monovalent radicals. Mention will be made, by way of illustration of such monovalent radicals, of the ethyl, propyl, butyl, tert-butyl or isopropyl radicals.

Preferably, the $R_L$ radical exhibits a molar mass of greater than 16 and more preferably of greater than 30. The $R_L$ radical can, for example, have a molar mass of between 40 and 450. By way of example, the $R_L$ radical can be a radical comprising a phosphoryl group, that is to say a $\equiv$P$=$O group, it being possible for the said $R_L$ radical to be represented by the formula

in which X and Y, which can be identical or different, can be chosen from alkyl, cycloalkyl, alkoxyl, aryloxyl, aryl, aralkyloxyl, perfluoroalkyl or aralkyl radicals and can comprise from 1 to 20 carbon atoms; X and/or Y can also be a halogen atom, such as a chlorine or bromine or fluorine or iodine atom.

The $R_L$ radical can also comprise at least one aromatic ring, such as the phenyl radical or the naphthyl radical, it being possible for the latter to be substituted, for example by an alkyl radical comprising from 1 to 10 carbon atoms.

Preferably, the carbon atom carrying the $R_L$ radical also carries at least one hydrogen atom, that is to say carries one or two hydrogen atoms.

Mention may be made, by way of examples of nitroxide of formula (2) which can be carried by the alkoxyamine of formula (1), of:

N-tert-butyl-1-phenyl-2-methylpropyl nitroxide,
N-(2-hydroxymethylpropyl)-1-phenyl-2-methylpropyl nitroxide,
N-tert-butyl-1-diethylphosphono-2,2-dimethylpropyl nitroxide,
N-tert-butyl-1-dibenzylphosphono-2,2-dimethylpropyl nitroxide,
N-tert-butyl-1-di(2,2,2-trifluoroethyl)phosphono-2,2-dimethylpropyl nitroxide, N-tert-butyl-1-diethylphosphono-2-methylpropyl nitroxide,
N-(1-methylethyl)-1-cyclohexyl-1-diethylphosphono nitroxide,
N-(1-phenylbenzyl)-1-diethylphosphono-1-methylethyl nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphonomethylethyl nitroxide.

If the alkoxyamine is monofunctional (n=1 in the formula (1)), A is a monofunctional radical and can be chosen, for example, from:
styryl radicals of formula

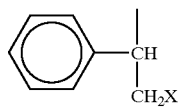

in which the phenyl radical is optionally substituted and X represents a halogen atom or a hydroxyl, phenoxy, alkoxy, acyl or cyano radical; acyl radicals of formula

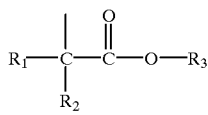

is in which $R_1$, $R_2$ and $R_3$ are identical or different and represent a hydrogen atom, a linear or branched alkyl radical comprising 1 to 20 carbon atoms and preferably 1 to 8 carbon atoms, or an aryl radical, which is optionally substituted, it being possible for the $R_3$ radical furthermore to comprise one or more heteroatoms, such as the nitrogen, oxygen or fluorine atom.

By way of examples, the monofunctional alkoxyamine can be chosen from the alkoxyamines represented by the following formulae:

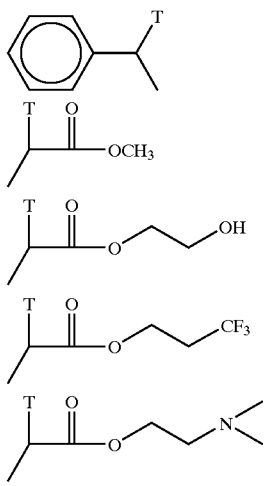

in which T has the meaning already given, that is to say represents the nitroxide of formula (2).

If the alkoxyamine is multifunctional, A is a multivalent radical. The alkoxyamine can then be one of those disclosed in French Patent Application No. 99 06329. Examples of multifunctional A radicals, the purpose of which is to form part of a multifunctional alkoxyamine, are given below:

a)

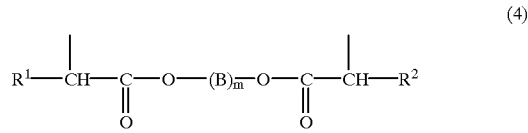

(4)

in which $R^1$ and $R^2$, which are identical or different, represent a linear or branched alkyl radical having a number of carbon atoms ranging from 1 to 10, phenyl or thienyl radicals which are optionally substituted by a halogen atom, such as F, Cl or Br, or by a linear or branched alkyl radical having a number of carbon atoms ranging from 1 to 4 or by nitro, alkoxy, aryloxy, carbonyl or carboxyl radicals; a benzyl radical, a cycloalkyl radical having a number of carbon atoms ranging from 3 to 12 or a radical comprising one or more saturations; B represents a linear or branched alkylene radical having a number of carbon atoms ranging from 1 to 20; and m is an integer ranging from 1 to 10;

b)

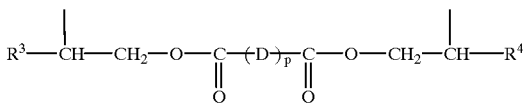

(5)

in which $R^3$ and $R^4$, which are identical or different, represent aryl, pyridyl, furyl or thineyl radicals optionally substituted by a halogen atom, such as F, Cl or Br, or by a linear or branched alkyl radical having a number of carbon atoms ranging from 1 to 4 or by nitro, alkoxy, aryloxy, carbonyl or carboxyl radicals; D represents a linear or branched alkylene radical having a number of carbon atoms ranging from 1 to 6, a phenylene radical or a cycloalkylene radical; and p ranges from 0 to 10;

c)

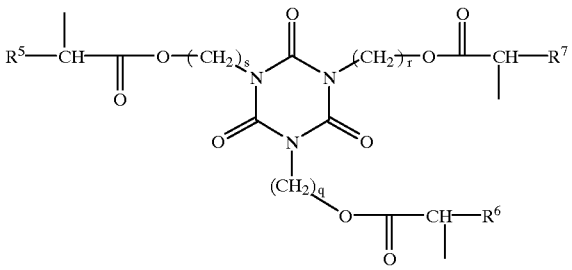

(6)

in which $R^5$, $R^6$ and $R^7$, which are identical or different, have the same meanings as $R^1$ and $R^2$ in the formula (4) and q, r and s are integers ranging from 1 to 5;

d)

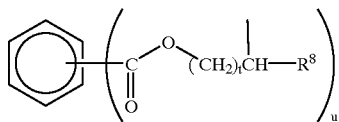

(7)

in which $R^8$ has the same meaning as $R^3$ and $R^4$ in the formula (5), t is an integer ranging from 1 to 4 and u is $\geq 2$ and $\leq 6$;

e)

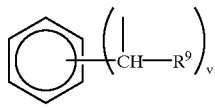

(8)

in which $R^9$ has the same meaning as the $R^8$ radical in the formula (7) and v is $\geq 2$ and $\leq 6$;

f)

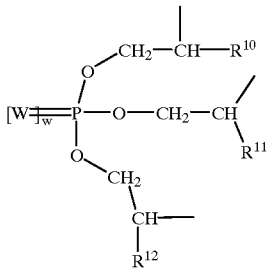

(9)

in which $R^{10}$, $R^{11}$ and $R^{12}$, which are identical or different, represent a phenyl radical optionally substituted by a halogen atom, such as Cl or Br, or by a linear or branched alkyl radical having a number of carbon atoms ranging from 1 to 10; W represents an oxygen, sulphur or selenium atom and w is equal to zero or 1;

g)

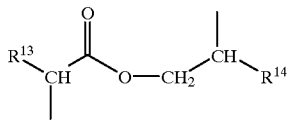

(10)

in which $R^{13}$ has the same meaning as $R^1$ in the formula (4) and $R^{14}$ has the same meaning as $R^3$ or $R^4$ in the formula (5);

h)

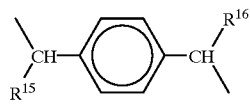

(11)

in which $R^{15}$ and $R^{16}$, which are identical or different, represent a hydrogen atom, a linear or branched alkyl radical having a number of carbon atoms ranging from 1 to 10, or an aryl radical optionally substituted by a halogen atom or a heteroatom.

The alkoxyamines can also be prepared by reaction of a free radical initiator with a stable free radical of formula (2). Thus, if the initiator is bifunctional (that is to say that each of its molecules result in the formation of two atoms exhibiting the radical state), like the majority of conventional commercial initiators, and if it is represented by B—B in so far as its dissociation results in the formation of two free radicals B•, the alkoxyamine formed will have the formula B-T, T having the meaning already given. Such an alkoxyamine is monofunctional (n=1 in the formula (1)). Mention may be made, as examples of a bifunctional initiator giving rise to the formation of a monofunctional alkoxyamine, of dicumyl peroxide or azobisisobutyronitrile (AIBN).

The free radical initiator can have a functionality of greater than 2 and in particular 4.

Mention may be made, as an example of an initiator with a functionality of 4, of ethyl 3,3-di(tert-amylperoxy) butyrate, which can be represented by:

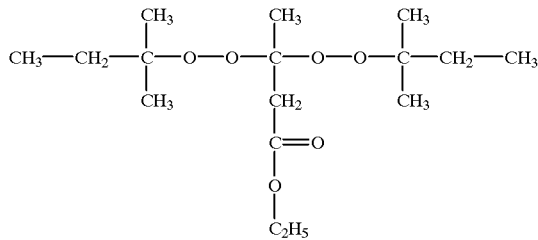

This peroxide can be represented by $B^a$-$B^b$-$B^a$, the said peroxide giving rise to the formation of the $B^{a\bullet}$ and $B^{b2\bullet}$ radicals, which result respectively in the alkoxyamines $B^a$-T (monofunctional) and T-$B^b$-T (which can also be represented by $B^b$-$T_2$) (bifunctional).

At least one of the alkoxyamines can be generated in the presence of monomer by virtue of the heat treatment of a free radical initiator and of a nitroxide of formula (2) in the presence of monomer. Thus, if the initiator is bifunctional and if it is represented by B—B in so far as its dissociation results in the formation of two free radicals B., the alkoxyamine formed will have the formula B-$(M)_m$-T, T having the meaning already given, M representing the monomer which can be polymerized by the radical route and m being a non zero integer. Such an alkoxyamine is monofunctional (n=1 in the formula (1)). If the initiator is of formula $B^a$-$B^b$-$B^a$ (as seen above), the said initiator giving rise to the formation of the $B^{a\bullet}$ and $B^{b2\bullet}$ radicals, the alkoxyamines $B^a$-$(M)_m$-T (monofunctional) and T-$(M)_m$-$B^b$-$(M)_{m'}$-T (bifunctional) will be formed as a mixture, m and m' representing non-zero integers. In the context of the present invention, at least one of the alkoxyamines can thus comprise polymerized units of a monomer which can be polymerized by the radical route, the said monomer being identical or different from the monomer which it is proposed to polymerize with the said alkoxyamine. At least one of the alkoxyamines can thus also be generated in situ in the polymerization medium in the presence of the monomer to be polymerized and at the beginning of the polymerization, according to the principle which has just been given.

If it is proposed to prepare an alkoxyamine by the heat treatment of a free radical initiator and of a nitroxide of formula (2), these two ingredients will be heated, in the presence or absence of monomer which can be polymerized by the radical route, in the presence or in the absence of a solvent, at a temperature sufficient for the initiator to generate its free radicals. This heat treatment is preferably carried out at least partially at a temperature ranging from Temp$_{1/2}$–20° C. and Temp$_{1/2}$+20° C., Temp$_{1/2}$ representing the temperature at which 50% of the initiator has decomposed in one hour. As some initiators, such as peracids, peresters, peracyls, percarbonates or perketals, can give rise to side reactions with the nitroxide of formula (2), it is preferable, for these initiators, to carry out the heat treatment in the presence of monomers which can be polymerized by the radical route, so that the alkoxyamine produced comprises, from the beginning, at least one monomer unit, without the intermediate stage of the formation of alkoxyamine devoid of monomer unit. The initiator and the nitroxide are each employed in an amount sufficient to form the desired alkoxyamine. Generally, it is preferable to employ the nitroxide in excess with respect to the stoichiometry of the targeted alkoxyamine, in particular if side reactions which consume the nitroxide are to be feared. If:

(SFR) denotes the number of moles of stable free radical, (INIT) denotes the number of moles of free radical initiator, F$_{INIT}$ denotes the functionality of the free radical initiator, that is to say the number of atoms exhibiting the free radical state which each initiator molecule is capable of generating, the ingredients necessary to manufacture the alkoxyamine are generally introduced so that the ratio [(SFR)]/[(INIT) F$_{INIT}$] is between 0.8 and 1.5, preferably between 1 and 1.4.

The free radical initiator can be chosen from known radical polymerization initiators. The free radical initiator is a radical polymerization initiator which can be chosen from diacyl peroxides, peroxyesters, dialkyl peroxides, peroxyacetals or azo compounds. The following are particularly suitable free radical initiators:

tert-butylperoxy isopropyl carbonate,
tert-butylperoxy 2-ethylhexyl carbonate,
dicumyl peroxide,
di-tert-butyl peroxide,
1,1-bis(tert-butylperoxy)cyclohexane,
1,1-bis(tert-butylperoxy)-3,3,5-trimethylcyclohexane,
tert-butyl peroxyacetate,
tert-butyl cumyl peroxide,
tert-butyl perbenzoate,
tert-butyl per(2-ethylhexanoate),
2,2-bis(tert-butylperoxy)butane,
butyl 4,4-bis(tert-butyl)valerate,
ethyl 3,3-bis(tert-butyl)butyrate,
2,2-bis(4,4-di(tert-butylperoxy)cyclohexyl)propane.

Mention may be made, as initiator of azo type, of the family represented by the formula

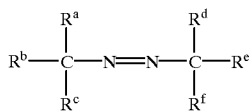

in which R$^a$, R$^b$, R$^c$, R$^d$, R$^e$ and R$^f$, which can be identical or different, represent a linear or branched alkyl radical comprising, for example, 1 to 12 carbon atoms or a polar group, such as a cyano or ester or guanidine or acid group. Mention may be made, as examples of such initiators, of:
4,4'-azobis(4-cyanopentanoic acid),
2,2'-azobis(2-methylbutyronitrile),
2,2'-azobis(2-aminopropane) dihydrochloride,
azobisisobutyronitrile.

The term "monomer" is understood to mean any monomer which can be polymerized or copolymerized by the radical route. The term "monomer" covers, of course, mixtures of several monomers.

The monomer can be chosen from vinyl, vinylidene, diene and olefinic, or allyl monomers.

The term "vinyl monomers" is understood to mean acrylic acid or its alkali metal or alkaline earth metal salts, such as the sodium, potassium or calcium salts, (meth)acrylates, vinylaromatic monomers, vinyl esters, (meth)acrylonitrile, (meth)acrylamide and mono- and di-(alkyl comprising 1 to 18 carbon atoms)-(meth)acrylamides, and monoesters and diesters of maleic anhydride and of maleic acid.

The (meth)acrylates are in particular those respectively of the formulae:

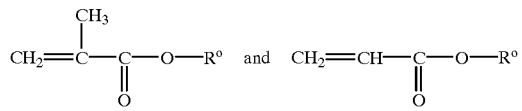

in which R° is chosen from linear or branched and primary, secondary or tertiary alkyl radicals comprising from 1 to 18 carbon atoms, cycloalkyl radicals comprising from 5 to 18 carbon atoms, (alkoxy comprising 1 to 18 carbon atoms)-alkyl radicals comprising 1 to 18 carbon atoms, (alkylthio comprising 1 to 18 carbon atoms)-alkyl radicals comprising 1 to 18 carbon atoms, aryl radicals and arylalkyl radicals, these radicals optionally being substituted by at least one halogen atom (such as fluorine) and/or at least one hydroxyl group after protection of this hydroxyl group, the above alkyl groups being linear or branched; and glycidyl, norbornyl and isobornyl (meth)acrylates.

Mention may be made, as examples of methacrylates, of methyl, ethyl, 2,2,2-trifluoroethyl, n-propyl, isopropyl, n-butyl, sec-butyl, tert-butyl, n-amyl, isoamyl, n-hexyl, 2-ethylhexyl, cyclohexyl, octyl, isooctyl, nonyl, decyl, lauryl, stearyl, phenyl, benzyl, β-hydroxyethyl, isobornyl, hydroxypropyl and hydroxybutyl acrylates.

Mention may be made, as examples of acrylates of the above formula, of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl, ethoxyethyl, perfluorooctyl and behenyl acrylates.

The term "vinylaromatic monomer" is understood to mean, within the meaning of the present invention, an aromatic monomer comprising ethylenic unsaturation, such as styrene, vinyltoluene, α-methyl-styrene, 4-methylstyrene, 3-methylstyrene, 4-methoxy-styrene, 2-(hydroxymethyl) styrene, 4-ethylstyrene, 4-ethoxystyrene, 3,4-dimethylstyrene, 2-chlorostyrene, 3-chlorostyrene, 4-chloro-3-methylstyrene, 3-(tert-butyl)styrene, 2,4-dichlorostyrene, 2,6-dichlorostyrene and 1-vinylnaphthalene.

Mention may be made, as vinyl esters, of vinyl acetate, vinyl propionate, vinyl chloride and vinyl fluoride.

Mention is made, as vinylidene monomer, of vinylidene fluoride.

The term "diene monomer" is understood to mean a diene chosen from linear or cyclic and conjugated or nonconjugated dienes, such as, for example, butadiene, 2,3-dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2- propenyl)-2-norbornene, 5-(5-hexenyl)-2-norbornene, 1,5-cyclooctadiene, bicyclo[2.2.2]octa-2,5-diene, cyclopentadiene, 4,7,8,9-tetrahydroindene and isopropylidenetetra-hydroindene.

Mention may be made, as olefinic monomers, of ethylene, butene, hexene and 1-octene. Fluorinated olefinic monomers may also be mentioned.

The process according to the invention makes possible the preparation of block polymers. This is because the polymerization of a first monomer by the process according to the invention leads to a living polymer block. It is then possible to connect this first block to a block of another polymer by placing the first living polymer block in a medium for the polymerization of a second monomer. It is thus possible to prepare block copolymers, for example copolymers comprising one or more polystyrene blocks and one or more polybutadiene blocks, or copolymers comprising one or more polystyrene blocks and one or more blocks of the methacrylate type and one or more blocks of the acrylate type.

In practice, the preparation of the blocks can be carried out in succession one after the other in the same equipment. When the first monomer is consumed, so as to prepare the first block, it is sufficient to introduce the second monomer intended for the preparation of the second block, without stopping the stirring and without cooling or other interruption. Of course, depending on the nature of the monomers, the conditions for forming each of the blocks, such as the temperature, can be adjusted.

Of course, it is possible to attach as many blocks as desired to the living polymer by placing the latter in a medium for the polymerization of a monomer from which it is desired to form a block.

Thus, the invention also relates to a process for the preparation of a block polymer comprising at least one stage according to the invention leading to a first living block, the said living block subsequently being placed in the presence of at least one other monomer from which it is desired to form a block attached to the first block, so as to form a living diblock, and so on, according to the number of blocks which it is desired to prepare.

Thus, the present application also relates to a process for the preparation of a diblock polymer comprising a stage of polymerization of a first monomer in accordance with the invention, so as to obtain a first living block, followed by a stage during which the first living block is placed in the presence of a second monomer which it is desired to polymerize, so as to form a second block attached to the first block.

The present application thus also relates to a process for the preparation of a triblock polymer comprising a stage of polymerization of a third monomer in the presence of a diblock polymer prepared in accordance with what has just been said, so as to form a third block attached to the diblock polymer.

When it is desired to prepare a block copolymer on the principle of what has just been said, the polymerization of a new monomer can be carried out in various ways and in particular the following:

a) addition of the new monomer directly to the polymerization medium, the polymerization temperature being changed or not being changed;

b) addition of the new monomer, after evaporation of the preceding residual monomer, the polymerization temperature being changed or not being changed;

c) addition of the new monomer after having blocked the preceding polymerization by lowering the temperature, the preceding residual monomer being evaporated or not being evaporated and then the temperature being raised to a new polymerization temperature suited to the new monomer.

By way of examples, the following block polymers can be prepared:

polystyrene-b-poly(methyl methacrylate),
polystyrene-b-polystyrenesulphonate,
polystyrene-b-polyacrylamide,
polystyrene-b-polymethacrylamide,
poly(methyl methacrylate)-b-poly(ethyl acrylate),
polystyrene-b-poly(butyl acrylate),
polybutadiene-b-poly(methyl methacrylate),
polyisoprene-b-polystyrene-co-acrylonitrile,
polybutadiene-b-polystyrene-co-acrylonitrile,
polystyrene-co-butyl acrylate-b-poly(methyl methacrylate),
polystyrene-b-poly(vinyl acetate),
polystyrene-b-poly(2-ethylhexyl acrylate),
polystyrene-b-poly(methyl methacrylate)-co-hydroxyethyl acrylate,
polystyrene-b-polybutadiene-b-poly(methyl methacrylate),
polybutadiene-b-polystyrene-b-poly(methyl methacrylate),
polystyrene-b-poly(butyl acrylate)-b-polystyrene,
polystyrene-b-polybutadiene-b-polystyrene,
polystyrene-b-polyisoprene-b-polystyrene,
poly(perfluorooctyl acrylate)-b-poly(methyl methacrylate),
poly(perfluorooctyl acrylate)-b-polystyrene,
poly(perfluorooctyl acrylate)-b-poly(behenyl acrylate),
poly(perfluorooctyl acrylate)-b-poly(stearyl methacrylate),
poly(n-octyl acrylate)-b-poly(methyl methacrylate).

If, in the context of the present invention, it is proposed to prepare a multimodal polymer comprising N modes (N different groups of molecules; N is thus a non zero integer) by using several alkoxyamines, the said alkoxyamines all carrying the same stable nitroxide radical and not carrying another type of stable radical (nitroxide or non-nitroxide), it is possible to predict the size and the number-average molecular mass of each mode (that is to say, each population of molecules) as soon as the mass and the size of the mode of lowest mass are known. Thus, in that context, if the polymerization is initiated by a mixture of N alkoxyamines A1, . . . Ai, . . . AN, the functionalities of which are respectively n1, . . . ni, . . . nN, the functionality of the said alkoxyamines increasing at the same time as i so that A1 has the lowest functionality of the alkoxyamines and AN has the highest functionality of the alkoxyamines, the functionality of the alkoxyamine Ai being xi times greater than that of the alkoxyamine A1 ($xi=ni/n1$), the said alkoxyamines being charged to the medium to be polymerized with the concentrations (A1), . . . (Ai), . . . (AN) respectively, so that the proportion of each alkoxyamine can be determined relative to the alkoxyamine A1 by $y_i=(A_i)/A_1$, each alkoxyamine leading to a population of molecules with a number-average molecular mass Mi with the proportion Pi (Pi thus being equal to the ratio of the mass of polymer resulting from Ai to the total mass of the polymer) so that $y_i=(\Sigma x_j y_j)P_i/x_i(1-P_i)(j\neq i)$, then the following relationships are observed:

$$M_i = x_i \times M_1,$$

$$P_i = x_i y_i / (\Sigma x_i y_i)$$

Under these conditions, it is sufficient to carry out a test with the alkoxyamine A1 to predict the distribution of the molecular masses of the final polymer initiated with N alkoxyamines, at otherwise identical polymerization conditions.

This monomer can be introduced either directly, for a bulk polymerization, or in solution or in a system of emulsion type.

During the polymerization and according to the nature of the alkoxyamine used, it is possible for the nitroxide part of the alkoxyamine to decrease in concentration because of side reactions. In this case and so that the polymerization should sufficiently retain its controlled nature, a choice of amount (as a function of the amount to be replaced) of additional nitroxide can optionally be added to the medium, which nitroxide may or may not correspond to the constituent nitroxide of the-alkoxyamine concerned but remains in accordance with the formula (2).

The alkoxyamines can be mixed with one another before introduction into the polymerization reactor or can be introduced separately into the polymerization reactor. Such mixtures of alkoxyamines are also a subject-matter of the present invention. The polymerization medium in the context of the present invention is itself such a mixture of alkoxyamines.

The polymers obtained can be characterized by gel permeation chromatography (GPC). The chromatogram makes it possible to visualise each group of polymer molecules.

Use may in particular be made of the technique described hereinbelow and used for the examples:

Two 30-cm PL gel mixed bed columns from Polymer Laboratories are used in series to analyse a sample of 80 microlitres of a 2 g/l solution of polymer in THF. The elution is 1 ml/min and the column temperature is 40° C. Detection is provided by a Waters 2410 refractometer adjusted to 30° C. in positive differential mode. It has a sensitivity of 4 mV.

The polymerization or the copolymerization is carried out under the usual conditions known to a person skilled in the art, taking into account the monomer or monomers considered. Thus, the polymerization or the copolymerization can be carried out in bulk, in solution, in emulsion or in suspension, at temperatures ranging from 50° C. to 250° C. and preferably ranging from 70° C. to 160° C.

Depending on the functionality of the alkoxyamines chosen, the polymerization can generally be carried out so that it leads to a multimodal polymer, at least one of the populations of molecules of which exhibits a number-average molecular mass ranging from 10 000 to 200 000, for example from 30 000 to 150 000, and at least one other population of molecules of which exhibits a number-average molecular mass ranging from 20 000 to 2 000 000, for example from 60 000 to 1 200 000. Generally, in the context of the present invention, from 2 to 5 and preferably 2 or 3 alkoxyamines exhibiting different values of n (of the formula (1)) are used, so as to result in a multimodal polymer exhibiting the same number of different populations as the number of different alkoxyamines used, that is to say that the multimodal polymer obtained generally exhibits from 2 to 5 populations and preferably 2 or 3. To optionally increase the number-average molecular masses of the final polymer, the monomer/alkoxyamine molar ratio and/or the duration of the reaction can be increased.

The present application also relates to the compositions comprising several alkoxyamines each comprising the sequence of formula (1) already described, the said alkoxyamines exhibiting different values of n. In these compositions, the $R_L$ radicals of at least two of the alkoxyamines preferably exhibit a molar mass of greater than 16. In these compositions, the $R_L$ radical of at least one, indeed even two, of the alkoxyamines preferably exhibits a molar mass of greater than 30 and more preferably of between 40 and 450. In these compositions, the $R_L$ radical of at least one, indeed even two, of the alkoxyamines can comprise a phosphoryl group. In these compositions, at least one, indeed even two, of the alkoxyamines is preferably such that the carbon atom carrying the $R_L$ radical also carries at least one hydrogen atom. In these compositions, the alkoxyamines can exhibit functionalities according to combinations already mentioned, for example at least one has a functionality of 1 and at least one other has a functionality of at least 2, for example from 2 to 8.

In these compositions, at least one, indeed even two, of the alkoxyamines can be prepared by reaction between a free radical initiator and a nitroxide, if appropriate in the presence of a monomer which can be polymerized by the radical route. As has already been explained, at least one, indeed even two, of the alkoxyamines can comprise polymerized units of at least one monomer which can be polymerized by the radical route.

The composition according to the invention can be a mixture prepared before any polymerization and intended to be used to initiate a controlled radical polymerization according to the process of the invention. During the polymerization process according to the invention, the polymerization medium itself must also be regarded as being a composition according to the invention since the growing polymer chains comprise, at their ends, nitroxides of formula (2) and thus form, with these nitroxides, alkoxyamines of formula (1), the cores A of which comprise the polymerized monomer units. In this case, the polymerization takes place in the presence of a composition according to the invention. Consequently, the multimodal polymer prepared by virtue of the process according to the invention, during the polymerization or after the polymerization, is also a composition according to the invention. In such a multimodal polymer, each population of molecules is bonded to one of the alkoxyamines. The composition comprising such a polymer is also a composition according to the invention.

In the examples which follow, the following products are used in particular:

AIBN

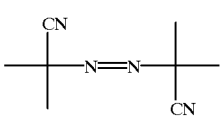

TEMPO

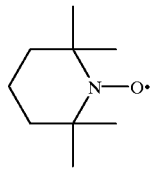

SG1

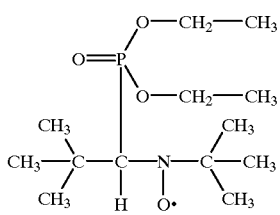

SG1 is the name given to the nitroxide N-1-diethylphosphono-2-dimethyl-N-1-dimethylethyl N-oxyl (which can also be called N-tert-butyl-1-diethyl-phosphono-2,2-dimethylpropyl nitroxide). TEMPO is that given to 2,2,6,6-tetramethylpiperidine N-oxyl.

The following alkoxyamines are also used:

Monams

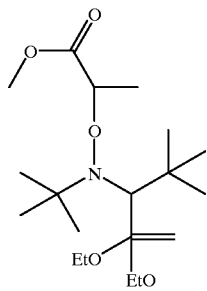

Diams

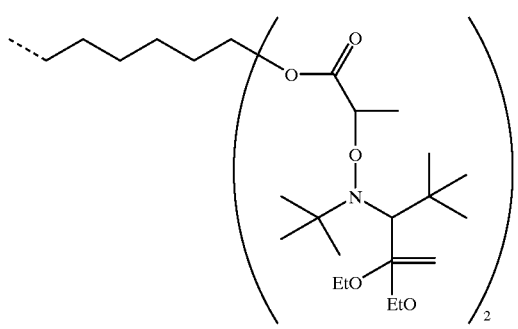

Triams

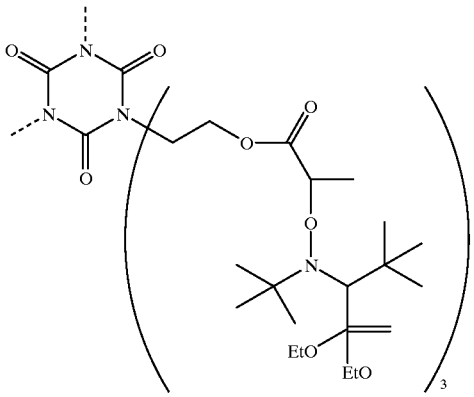

Octopus

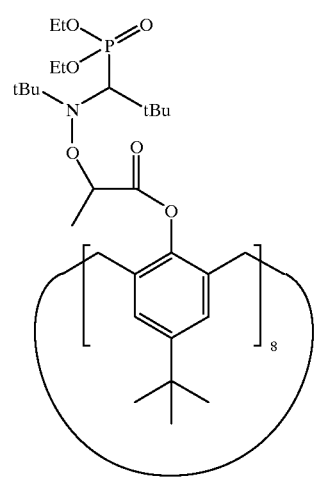

Tetratempo

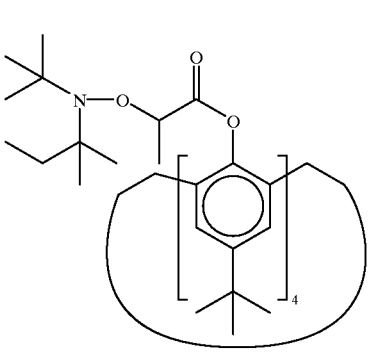

In the formulae which has just been given, tBu represents the tert-butyl radical and Et denotes the ethyl radical.

In the examples which follow, the following abbreviations were used:

Mw: Weight-average molecular mass;
Mn: Number-average molecular mass;

PI: Polydispersity index, equal to Mw/Mn;
GPC: Gel permeation chromatography;
Cv: Conversion of monomer to polymer, the said conversion being equal to the ratio 100×(M°−M)/M in which M° represents the initial concentration of monomer and M represents the concentration of monomer at a given instant.

EXAMPLE 1

Alkoxyamine-initiator Mixture With an Additional Contribution of SG1 Nitroxide 5 ml of styrene (4.5 g, i.e. 43.6 mmol), 20 mg of Triams ($1.58 \times 10^{-5}$ mol), 4.1 mg of azobisisobutyronitrole (AIBN) (i.e. $2.5 \times 10^{-5}$ mol) and 25.3 mg of SG1 with a purity of 73% (i.e. $6.3 \times 10^{-5}$ mol) are introduced into a reactor. The theoretical masses targeted at 100% conversion are thus 150 000 g/mol for the population resulting from the Triams and 50 000 g/mol for that produced by AIBN.

The reactor is degassed and then stirring is begun at 123° C. After 3.8 hours, heating is halted and the polymer obtained is analysed (70% conversion was obtained, i.e. theoretical masses of 105 000 g/mol and 35 000 g/mol achieved). GPC analysis provides a chromatogram on which two very distinct peaks are present:

First peak: $M_{n1}$=34,600 g/mol; $PI_1$=1.03.
Second peak: $M_{n2}$=90,000 g/mol; $PI_2$=1.08.

EXAMPLE 2

(Comparative)

Triams and AIBN Without Additional SG1

The preceding reaction is repeated, the addition of SG1 being omitted. After 2 hours, 85% conversion was achieved.

A single broad peak (PI=1.5) exhibiting a slight shoulder towards the low masses is obtained.

EXAMPLE 3

(Comparative)

AIBN/TEMPO 5 ml of styrene (43 millimole), 0.0177 g of TETRATEMPO ($1.13 \times 10^{-5}$ mol) and 3.3 g of AIBN ($2 \times 10^{-5}$ mol) are used with 7.3 mg of TEMPO ($4.7 \times 10^{-5}$ mol). The procedure followed is the same as in Example 1. After polymerizing for 5 hours, a polymer is obtained, the chromatogram of which exhibits only a single broad peak (PI=1.4) with a slight shoulder towards the high masses.

EXAMPLES 4 AND 5

Syntheses of Bimodal Copolymers

The mixture of alkoxyamines starting from the Monams and Diams alkoxyamines is prepared in the reactor and then styrene is added according to the compositions specified in Table 1. The mixture is flushed with nitrogen, then the temperature is brought to 120° C. and vigorous stirring is maintained. A sample (5 g), which is drawn off under vacuum at 80° C., is withdrawn every ½ hours. The conversion of the styrene is measured on each sample by solids content. Heating the reactor is halted from 50% conversion. Once the mixture is cooled, the degree of conversion is again evaluated by evaporating the residual monomer under vacuum. The polymer is subsequently analysed by GPC. Starting from 20 g of polymer obtained in the preceding stage, the polymerization is continued by diluting the said polymer in 150 g of butyl acrylate, and 400 mg of additional SG1 nitroxide are added. The mixtures are degassed and the polymerization is continued at 120° C. until approximately 60% conversion is achieved. The copolymers obtained are analysed by steric exclusion chromatography.

TABLE 1

| Ex. No. | Reactants | | | | Final copolymer | | | | |
|---|---|---|---|---|---|---|---|---|---|
| | Monams | Diams | Styrene | Acrylate | | $Mn_1$ | $Mn_2$ | $PI_1$ | $PI_2$ |
| 4 | 1 g<br>2.6 mmol | 1.06 g<br>1.3 mmol | 100 g<br>0.96 mol | 150 g<br>1.17 mol | Bimodal | 18 000 | 51 000 | 1.27 | 1.07 |
| 5 | 0.5 g<br>1.3 mmol | 0.53 g<br>0.65 mmol | 150 g<br>1.44 mol | 150 g<br>1.17 mol | Bimodal | 149 000 | 291 000 | 1.18 | 1.12 |

For these examples, the monitoring of the polymerization shows that the latter is well controlled, since the plot of ln(M°/M) as a function of time very largely follows a straight line. Furthermore, as $x_2$ is 2, it is found that effectively $Mn_2$ is substantially equal to 2 times $Mn_1$.

EXAMPLES 6 TO 8

Bipopulation, the Second Population of Which has Triple the Mass of the First

The preparation is carried out as for Examples 4 and 5, except that Diams is replaced with Triams and that the amounts shown in Table 2 are used. The results are recorded in Table 2.

TABLE 2

| Ex. No. | Reactants | | | | | | | Final copolymer | | | | |
|---|---|---|---|---|---|---|---|---|---|---|---|---|
| | Monams | Triams | Styrene | Acrylate | $x_2$ | $y_2$ | Cv | | $Mn_1$ | $Mn_2$ | $PI_1$ | $PI_2$ |
| 6 | 1 g<br>2.6 mmol | 1.13 g<br>0.87 mmol | 100 g<br>0.96 mol | 150 g<br>1.17 mol | 3 | 1 | 50 | Bimodal | 7 800 | 25 360 | 1.18 | 1.21 |
| 7 | 0.5 g<br>1.3 mmol | 0.57 g<br>0.43 mmol | 150 g<br>1.44 mol | 150 g<br>1.17 mol | 3 | 1 | 50 | Bimodal | 33 888 | 111 024 | 1.27 | 1.11 |
| 8 | 1 g<br>2.6 mmol | 0.57 g<br>0.43 mmol | 225 g<br>2.16 mol | 150 g<br>1.17 mol | 3 | 0.5 | 50 | Bimodal | 29 252 | 108 181 | 1.23 | 1.07 |

For these examples, the monitoring of the polymerization shows that the latter is well controlled since the plot of ln(M°/M) as a function of time very largely follows a straight line. Furthermore, as $x_2$ is 3, it is found that effectively $Mn_2$ is substantially equal to 3 times $Mn_1$.

EXAMPLES 9 TO 11

Synthesis of Tripopulated Polystyrenes

The mixture of alkoxyamines used in these examples is composed of Monams, of Diams and of Triams in the proportions described in Table 3. The polymerization procedure remains the same as above.

TABLE 3

| Ex. No. | Reactants | | | | Final copolymer | | | | | | |
|---|---|---|---|---|---|---|---|---|---|---|---|
| | Monams | Diams | Triams | Styrene | | $Mn_1$ | $Mn_2$ | $Mn_3$ | $PI_1$ | $PI_2$ | $PI_3$ |
| 9 | 1 g<br>2.6 mmol | 1.06 g<br>1.3 mmol | 1.13 g<br>0.87 mmol | 150 g<br>1.44 mol | Trimadal | | 15 897 | | 1.57 | 1.2 | 1.3 |
| 10 | 0.5 g<br>1.3 mmol | 0.53 g<br>0.65 mmol | 0.57 g<br>0.43 mmol | 225 g<br>2.16 mol | Trimodal | 23 000 | 46 288 | 72 000 | 1.17 | 1.1 | 1.19 |
| 11 | 0.17 g<br>0.45 mmol | 0.18 g<br>0.23 mmol | 0.19 g<br>0.14 mmol | 250 g<br>2.4 mol | Trimodal | 83 408 | 256 793 | 429 000 | 1.4 | 1.1 | 1.1 |

For these examples, the monitoring of the polymerization shows that the matter is well controlled since the plot of ln(M°/M) as a function of time very largely follows a straight line.

EXAMPLE 12

Synthesis of Bipopulated Poly(butyl acrylate)

The same polymerization procedure as in Example 4 is again used, except that styrene is replaced with butyl acrylate and except that 4 mol % of SG1 nitroxide with respect to the total number of nitroxide functional groups present in the starting mixture of alkoxyamines are added. The composition of the initiator mixture and the amount of monomer used are summarized in Table 4 (no use of Diams). A bimodal poly(butyl acrylate) is obtained.

Furthermore, as $x_2$ is 3, it is found that effectively $Mn_2$ is substantially equal to 3 times $Mn_1$.

EXAMPLE 13

Synthesis of a Bipopulated Copolymer With Triple Masses

The polymer obtained at the end of Example 7 is taken, dried under vacuum and then diluted in butyl acrylate (150 g of butyl acrylate per 20 g of polymer) and 150 ppm of SG1 free nitroxide are added to the reaction-mixture. The mixture is degassed and then the polymerization is begun by raising the temperature to 123° C. After 2 hours, a bimodal polymer is obtained, the first mode of which has an Mw of 57 000 g/mol and the second mode of which has an Mw of 181 000 g/mol. The polydispersity of the first peak is 1.44, whereas the second has a polydispersity of 1.13.

The living nature of the polymerization is clearly confirmed by the fact that the masses of the starting polymers have increased by virtue of the polymerization of the butyl acrylate. The markedly bimodal nature is clearly demonstrated by the GPC spectra.

Conversion: Cv=62%

EXAMPLE 14

Synthesis of a Bipopulated Polystyrene With a Mass Ratio of 8

According to a process analogous to that of Examples 4 to 8, using a mixture of Monams and of Octopus, the

TABLE 4

| Ex. No. | Monams | Triams | Butyl acrylate | Conversion | $Mn_1$ | $Mn_2$ | $PI_1$ | $PI_2$ |
|---|---|---|---|---|---|---|---|---|
| 12 | 0.036 g<br>0.09 mmol | 0.043 g<br>0.03 mmol | 8.74 g<br>68 mmol | 81% | 38 900 | 116 700 | 1.09 | 1.13 | proportions of which are mentioned in Table 5, a bipopulated polymer is obtained, after polymerization of styrene at 120° C., which exhibits two mass peaks, the ratio of the number-average molecular masses of which is 8.8 (the theoretical ratio $x_2$ being 8), with a proportion of polymers of high mass of 8.5% (theoretical value $y_2$ being 10%).

TABLE 5

| Ex. No. | Monams | Octopus | $x_2$ | $y_2$ | Styrene | Cv | $Mn_1$ | $Mn_2$ | $PI_1$ | $PI_2$ |
|---|---|---|---|---|---|---|---|---|---|---|
| 14 | 0.33 g 0.86 mmol | 0.08 g 0.015 mmol | 8 | 0.1 | 200 g 1.92 mol | 50% | 112 300 | 990 000 | 1.69 | 1.1 |

Furthermore, as $x_2$ is 8, it is found that effectively $Mn_2$ is substantially equal to 8 times $Mn_1$.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/04.557, are hereby incorporated by reference.

In the above description of the invention and in the following claims, the expression "radical polymerization" is synonymous to "free radical polymerization" and the expression "molecular mass(es)" is synonymous with "molecular weight(s)". Also, the expression "molar mass" is synonymous with molecular weight. Finally, where the word "example(s)" is used, it is intended that the example(s) include but are not limited to the exemplified subgenera and species.

From the foregoing description, one skilled in the art can easily ascertain the essential characteristics of this invention, and without departing from the spirit and scope thereof, can make various changes and modifications of the invention to adapt it to various usages and conditions. For example, the unfulfilled valences in the sequence can be not only hydrogen or hydrocarbon, but also any other moiety which does not destroy the intended polymerization function of the alkoxyamine of the present invention.

What is claimed is:

1. A composition comprising several chemically different alkoxyamines, unsubstituted or substituted, each comprising a sequence of the formula:

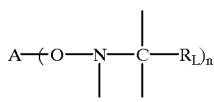

in which $R_L$ represents a monovalent radical exhibiting a molar mass of greater than 15, A represents the core of the alkoxyamine having a carbon atom bonded to —O— and n is a non-zero integer, said alkoxyamines exhibiting different values of n, and the unfulfilled valences represent hydrogen or hydrocarbon.

2. A composition according to claim 1, wherein the RL radicals of at least two of the alkoxyamines exhibit a molar mass of greater than 16.

3. A composition according to claim 1, wherein the RL radical of at least one of the alkoxyamines exhibits a molar mass of greater than 30.

4. A composition according to claim 1, wherein the RL radicals of at least two of the alkoxyamines exhibit a molar mass of greater than 30.

5. A composition according to claim 1, wherein the RL radical of at least one of the alkoxyamines exhibits a molar mass of between 40 and 450.

6. A composition according to claim 1, wherein the RL radicals of at least two of the alkoxyamines exhibit a molar mass of between 40 and 450.

7. A composition according to claim 1, wherein the $R_1$ radical of at least one of the alkoxyamines comprises a phosphoryl group.

8. A composition according to claim 1, wherein the $R_1$ radicals of at least two of the alkoxyamines comprise a phosphoryl group.

9. A composition according to claim 1, wherein at least one of the alkoxyamines is such that the carbon atom carrying the $R_L$ radical also carries at least one hydrogen atom.

10. A composition according to claim 1, wherein at least two of the alkoxyamines are such that the carbon atom carrying the $R_L$ radical also carries at least one hydrogen atom.

11. A composition according to claim 1, wherein at least one of the alkoxyamines exhibits a functionality of 1 and in that at least one other alkoxyamine exhibits a functionality of at least 2.

12. A composition according to claim 11, wherein said at least one other alkoxyamine exhibits a functionality ranging from 2 to 8.

13. A composition according to claim 1, wherein at least one of the alkoxyamines comprises polymerized units of at least one monomer which can be polymerized in a free radical system.

14. A composition according to claim 1, wherein at least two of the alkoxyamines comprise polymerized units of at least one monomer which can be polymerized in a free radical system.

15. A composition according to claim 1, wherein at least one of the alkoxyamines is prepared by reaction between a free radical initiator and a nitroxide.

16. A composition according to claim 1, wherein at least one of the alkoxyamines is prepared by reaction between a free radical initiator and a nitroxide in the presence of a monomer which can be polyinerized in a free radical system.

17. A composition according to claim 1, comprising a polymerization medium containing a composition according to claim 1 and at least one polymerizate.

18. A composition according to claim 17, comprising a multimodal polymer, each population of which is bonded to one of the alkoxyamines.

19. A process for the preparation of a multimodal polymer by controlled radical polymerization of at least one monomer, said polymerization being initiated or taking place in the presence of a composition of claim 1.

20. A process according to claim 19, wherein the polymerization takes place at between 70 and 160° C.

21. A process according to claim 19, wherein a nitroxide exhibiting the sequence of formula:

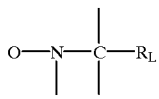

in which $R_L$ represents a monovalent radical exhibiting a molar mass of greater than 15, is added to the polymerization medium.

22. A process according to claim 21, wherein the $R_L$ radical of the nitroxide exhibits a molar mass of greater than 16.

23. A process according to claim 19, wherein the polymerization conditions are such that the polymerization leads to a multimodal polymer, at least one of the populations of molecules of which exhibits a number-average molecular mass ranging from 10 000 to 200 000 and at least one other population of molecules of which exhibits a number-average molecular mass ranging from 20 000 to 2 000 000.

24. A process according to claim 23, wherein the polymerization conditions are such that the polymerization leads to a multimodal polymer, at least one of the populations of molecules of which exhibits a number-average molecular mass ranging from 30 000 to 150 000 and at least one other population of molecules of which exhibits a number-average molecular mass ranging from 60 000 to 1 200 000.

* * * * *

UNITED STATES PATENT AND TRADEMARK OFFICE
CERTIFICATE OF CORRECTION

PATENT NO. : 6,646,079 B2
DATED : November 11, 2003
INVENTOR(S) : Oliver Guerret et al.

It is certified that error appears in the above-identified patent and that said Letters Patent is hereby corrected as shown below:

Column 23,
Lines 62 and 65, reads "RL" should read -- $R_L$ --

Column 24,
Lines 1, 4, and 16, reads "RL" should read -- $R_L$ --
Lines 19 and 22, reads "$R_1$" should read -- $R_L$ --
Line 53, reads "polyinerized" should read -- polymerized --

Signed and Sealed this

Third Day of August, 2004

JON W. DUDAS
*Acting Director of the United States Patent and Trademark Office*